US007362598B2

United States Patent
Schaible et al.

(10) Patent No.: US 7,362,598 B2
(45) Date of Patent: Apr. 22, 2008

(54) SYNCHRONOUS RECTIFIER GATE DRIVE SHUTDOWN CIRCUIT

(75) Inventors: Todd Martin Schaible, Orono, MN (US); John Phillip Schmitz, Oakdale, MN (US)

(73) Assignee: Artesyn Technologies, Inc., Boca Raton, FL (US)

( * ) Notice: Subject to any disclaimer, the term of this patent is extended or adjusted under 35 U.S.C. 154(b) by 137 days.

(21) Appl. No.: 11/016,303

(22) Filed: Dec. 17, 2004

(65) Prior Publication Data

US 2006/0133116 A1    Jun. 22, 2006

(51) Int. Cl.
    *H02M 5/42*    (2006.01)
(52) U.S. Cl. .......................... 363/89; 363/86
(58) Field of Classification Search ................ 363/17, 363/89, 132, 86, 90
    See application file for complete search history.

(56) References Cited

U.S. PATENT DOCUMENTS

| | | | |
|---|---|---|---|
| 5,418,703 A * | 5/1995 | Hitchcock et al. ............ 363/17 |
| 6,084,792 A | 7/2000 | Chen et al. |
| 6,256,214 B1 | 7/2001 | Farrington et al. |
| 6,301,139 B1 | 10/2001 | Patel |
| 6,370,044 B1 | 4/2002 | Zhang et al. |
| 6,377,477 B1 | 4/2002 | Xie et al. |
| 6,426,884 B1 * | 7/2002 | Sun .............................. 363/17 |
| 6,473,317 B1 | 10/2002 | Simopoulos |
| 6,490,183 B2 * | 12/2002 | Zhang ........................... 363/89 |
| 6,535,400 B2 * | 3/2003 | Bridge ...................... 363/21.06 |
| 6,570,268 B1 | 5/2003 | Perry et al. |
| 6,583,993 B2 | 6/2003 | Hua |
| 6,597,587 B1 | 7/2003 | Poon et al. |
| 6,650,552 B2 * | 11/2003 | Takagi et al. ................ 363/17 |
| 6,711,039 B2 | 3/2004 | Brkovic |
| 6,744,647 B2 | 6/2004 | Cohen |
| 6,760,235 B2 | 7/2004 | Lin et al. |
| 6,771,059 B1 | 8/2004 | Zwicker |
| 6,781,852 B2 | 8/2004 | Hatta et al. |
| 6,785,151 B2 * | 8/2004 | Ingman et al. ................ 363/91 |
| 6,831,847 B2 | 12/2004 | Perry |
| 6,888,728 B2 * | 5/2005 | Takagi et al. ................ 363/17 |
| 6,980,447 B1 * | 12/2005 | Schaible et al. ......... 363/56.05 |
| 2001/0006471 A1 | 7/2001 | Diallo et al. |
| 2002/0044470 A1 | 4/2002 | Hua |
| 2003/0021128 A1 | 1/2003 | Brkovic |
| 2003/0151927 A1 | 8/2003 | Wittenbreder |
| 2004/0130921 A1 | 7/2004 | Fukumoto |
| 2004/0174721 A1 | 9/2004 | Yamamoto |

* cited by examiner

*Primary Examiner*—Shawn Riley
(74) *Attorney, Agent, or Firm*—Kirkpatrick & Lockhart Preston Gates Ellis LLP

(57) ABSTRACT

A power converter that includes a transformer, a bridge input circuit, a self-driven synchronous rectifier circuit, a gate drive circuit, and a gate drive shutdown circuit. The transformer includes a primary winding connected to the bridge input circuit, a first secondary winding, and a second secondary winding. The self-driven synchronous rectifier circuit is connected to the first secondary winding and includes a first synchronous rectifier for rectifying a voltage across the first secondary winding. The first synchronous rectifier includes a control terminal responsive to a voltage across the second secondary winding. The gate drive circuit includes a first diode connected to the control terminal of the first synchronous rectifier for introducing a dc level shift thereto. The gate drive shutdown circuit is connected to the first diode of the gate drive circuit and includes a switch for removing the dc level shift from the control terminal of the first synchronous rectifier when operation of the bridge input circuit is terminated.

20 Claims, 7 Drawing Sheets

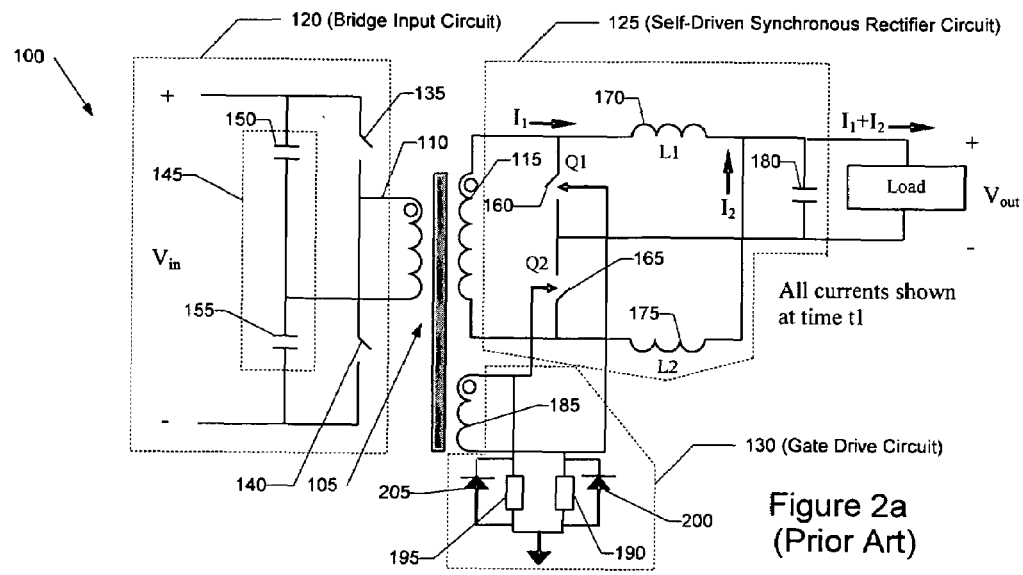
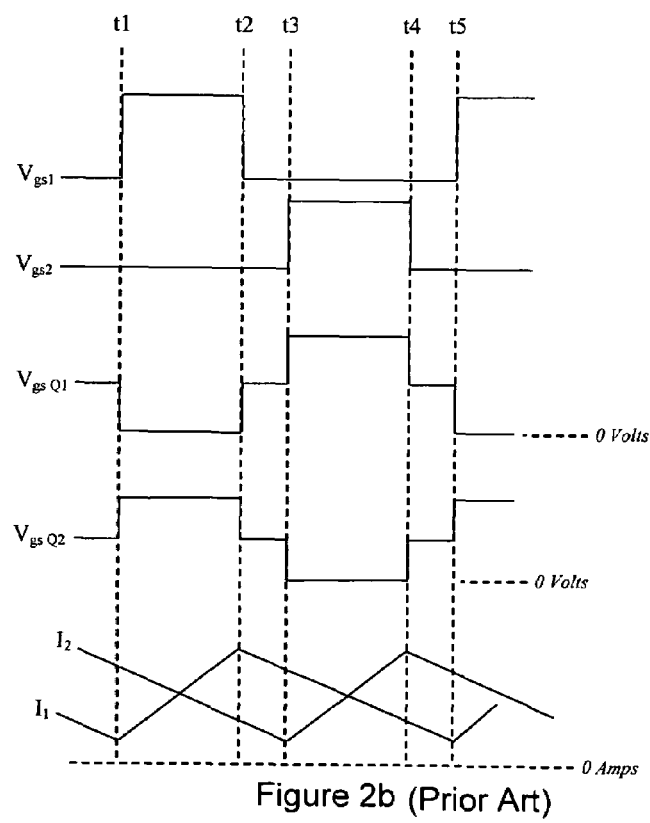
Figure 2a (Prior Art)
Figure 2b (Prior Art)

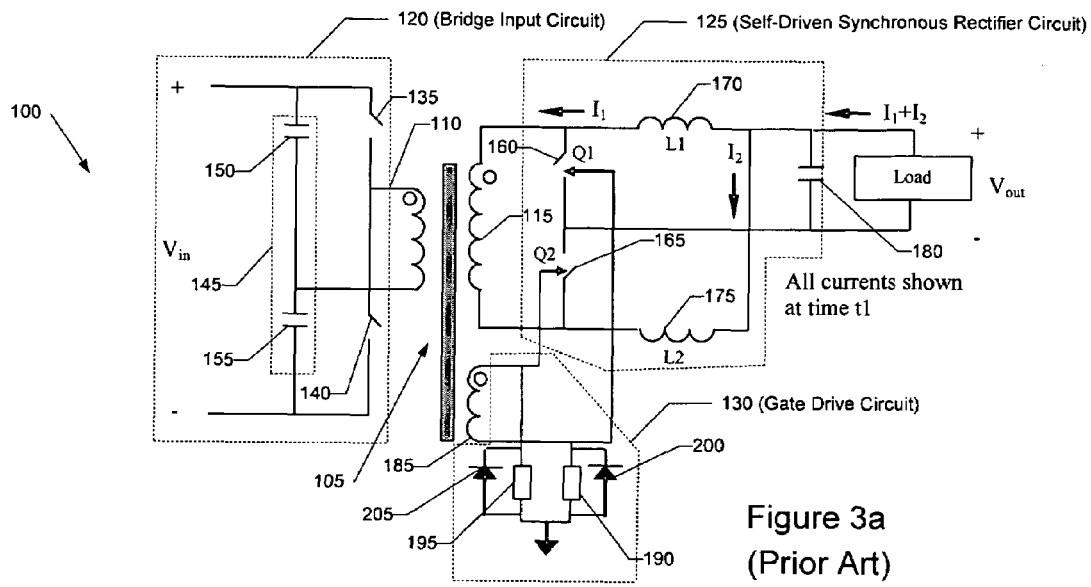
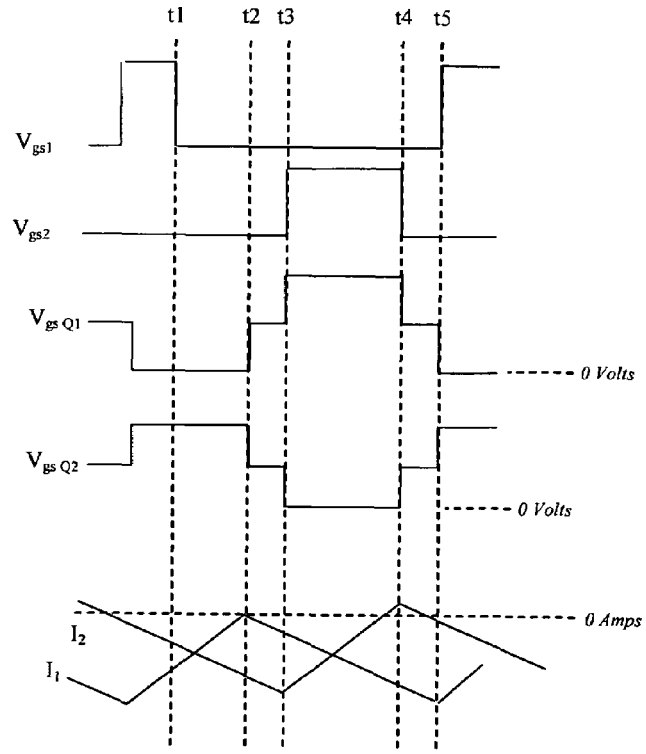
Figure 3a (Prior Art)
Figure 3b (Prior Art)

SYNCHRONOUS RECTIFIER GATE DRIVE SHUTDOWN CIRCUIT

BACKGROUND OF THE INVENTION

This application is related, generally and in various embodiments, to synchronous rectifier circuits.

Synchronous rectifier circuits for producing a unipolar DC voltage output from an alternating voltage input are well known and commonly used in a variety of power converter topologies such as, for example, half-bridge and full-bridge DC-DC power converters. Power converters having these bridge topologies typically include a bridge input circuit connected to a primary winding of an isolation transformer ("primary stage"), and a synchronous rectification circuit connected to a secondary winding of the isolation transformer ("secondary stage"). The bridge input circuit typically includes switching devices ("primary switches"), such as field effect transistors (FETs), for converting a DC input voltage into an alternating voltage. The alternating voltage is coupled from the primary winding to the secondary winding and then rectified by the synchronous rectifier circuit to produce a DC output voltage. Increasing or decreasing the duty cycle of the primary switches using, for example, pulse-width modulated (PWM) control signals, produces a corresponding increase or decrease in the DC output voltage.

Rectification of the alternating voltage is typically performed using metal-oxide-semiconductor field effect transistor synchronous rectifiers (MOSFET SRs). Because the forward voltage drop across a MOSFET SR, and hence its power loss, is less than that of a diode, MOSFET SRs are more efficient than diode-based rectifiers, particularly for low output voltage applications. Unlike a diode, however, MOSFET SRs may conduct current in both directions (i.e., forward and reverse). Accordingly, a synchronous rectifier circuit typically includes a gate drive circuit for supplying a gate control signal to a gate terminal of each MOSFET SR in order to render it non-conductive during reverse bias. Depending upon the configuration of the gate drive circuit, the synchronous rectifier circuit may be classified as "control-driven" or "self-driven." In a control-driven scheme, the gate control signals are generated indirectly by a separate gate drive circuit. The gate drive circuit may be controlled, for example, using a gate drive transformer driven by the PWM control signals of the primary stage. In a self-driven scheme, the gate drive circuit utilizes existing power signals to control the MOSFET SRs. For example, the gate control signals may be obtained from an auxiliary secondary winding, or directly from the secondary winding of the isolation transformer.

In self-driven synchronous rectifier circuits having an auxiliary secondary winding as described above, it is known that MOSFET SR switching efficiency may be improved by introducing a positive voltage shift to the gate drive signals using gate rectification diodes. During periods in which the voltage across the auxiliary secondary winding is zero (i.e., during "deadtime"), the shifted gate drive signals render the MOSFET SRs conductive. Thus, "freewheeling" current that would otherwise flow through a lossy MOSFET SR body diodes instead flows through the MOSFET SR channels, resulting in decreased power loss.

Use of gate rectification diodes may have deleterious consequences, however, if the power converter is turned off (i.e., the primary switches are turned off) during the flow of negative inductor current in the synchronous rectifier circuit. Negative current flow may occur, for example, during a period after the power converter is turned on if the power converter is configured in parallel with other operating power converters. Negative current may also occur during operation if the duty cycle of the primary switches is decreased in order to command a lower output voltage. If the power converter is turned off under such circumstances, the dissipation of negative inductor current flow in the synchronous rectifier circuit will induce current flow in the auxiliary secondary winding and the primary winding. The MOSFET SRs will thus continue to switch, causing the synchronous rectifier circuit to self-oscillate at a frequency determined by the time required for the MOSFET SRs to discharge the shifted gate voltages introduced by the gate rectification diodes. Because the negative inductor current flow in the synchronous rectifier circuit progressively increases during each switching cycle of the MOSFET SRs, damaging voltages may be applied to the MOSFET SR gates, the bridge input circuit, and other power converter components.

In control-driven synchronous rectifier circuits, similar consequences may result if the MOSFET SRs are turned off during the flow of negative inductor current. In particular, although turning the MOSFET SRs off effectively prevents self-oscillation in the synchronous rectifier circuit, the paths necessary for dissipating negative inductor current flow are eliminated. Damaging voltage spikes resulting from uncontrolled inductor discharge may thus occur.

Accordingly, there exists a need in self-driven and control-driven synchronous rectifier circuits for a manner to controllably dissipate negative inductor current flow when the power converter is turned off.

SUMMARY

In one general respect, embodiments of the present invention are directed to a power converter. According to various embodiments, the power converter includes a transformer, a bridge input circuit, a self-driven synchronous rectifier circuit, a gate drive circuit, and a gate drive shutdown circuit. The transformer includes a primary winding connected to the bridge input circuit, a first secondary winding, and a second secondary winding. The self-driven synchronous rectifier circuit is connected to the first secondary winding and includes a first synchronous rectifier for rectifying a voltage across the first secondary winding. The first synchronous rectifier includes a control terminal responsive to a voltage across the second secondary winding. The gate drive circuit includes a first diode connected to the control terminal of the first synchronous rectifier for introducing a dc level shift thereto. The gate drive shutdown circuit is connected to the first diode of the gate drive circuit and includes a switch for removing the dc level shift from the control terminal of the first synchronous rectifier when operation of the bridge input circuit is terminated.

In another general respect, embodiments of the present invention are directed to, in a power converter comprising a bridge input circuit and a self-driven synchronous rectifier circuit, a gate drive shutdown circuit. According to various embodiments, the gate drive shutdown circuit comprises a switch for removing a dc level shift from a control terminal of the synchronous rectifier circuit when operation of the bridge input circuit is terminated.

In another general respect, embodiments of the present invention are directed to, in a power converter comprising a bridge input circuit and a self-driven synchronous rectifier circuit, a method for reducing self-oscillation in the synchronous rectifier circuit due to negative current flowing therein when operation of the bridge input circuit is terminated. According to various embodiments, the method comprises sensing the termination of operation of the bridge input circuit; and in response to sensing the termination of operation of the bridge input circuit, removing a dc level shift from a control terminal of the synchronous rectifier circuit.

DESCRIPTION OF THE FIGURES

Various embodiments of the present invention will be described by way of example in conjunction with the following figures, wherein:

FIG. 2a is a schematic diagram of another typical half-bridge power converter power converter;

FIG. 2b illustrates idealized current and voltage waveforms present in the power converter of FIG. 2a during operation;

FIGS. 3a-b illustrate effects of negative inductor current flow during operation of the power converter of FIG. 2a;

DETAILED DESCRIPTION

Figure 1A:
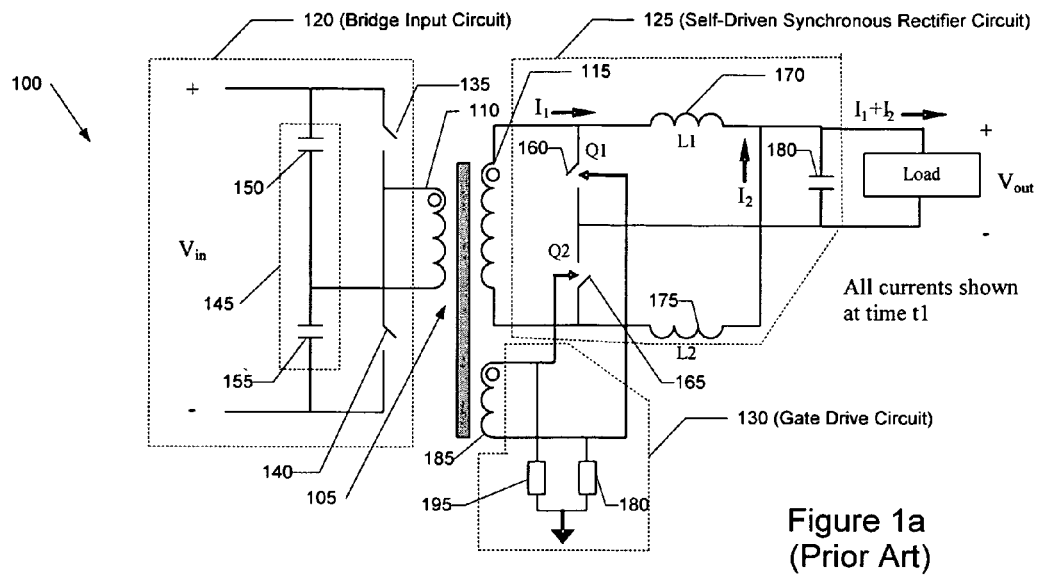
FIG. 1a is a schematic diagram of a typical half-bridge power converter.

FIG. 1a is a schematic diagram of a typical half-bridge power converter 100 for converting an input voltage ($V_{in}$) to an output voltage ($V_{out}$) for powering a load. The power converter 100 includes an isolation transformer 105 comprising a primary winding 110, a first secondary winding 115, and a second secondary winding 185. The power converter 100 also includes a bridge input circuit 120 connected to the primary winding 110 and a self-driven synchronous rectifier circuit 125 connected to the first secondary winding 115. The power converter 100 further includes a gate drive circuit 130 connected to the synchronous rectifier circuit 125. The primary winding 110 and the bridge input circuit 120 may be considered as the "primary stage" of the power converter 100. The first and second secondary windings 115, 185, the synchronous rectifier circuit 125, and the gate drive circuit 130 may be considered as the "secondary stage" of the power converter 100.

The bridge input circuit 120, as shown in FIG. 1a, includes a first primary power switch 135, a second primary power switch 140, and a voltage divider circuit 145 comprising first and second capacitors 150, 155 connected in series across a DC input voltage ($V_{in}$). Each primary power switch 135, 140 may be, for example, a n-channel MOSFET having a gate terminal, a drain terminal, and a source terminal. Operation of the n-channel MOSFET is such that forward biasing the gate terminal with respect to the source terminal renders the n-channel MOSFET conductive, or "on," allowing current to flow from the drain terminal to the source terminal. Conversely, reverse biasing the gate terminal with respect to the source terminal renders the n-channel MOSFET non-conductive, or "off," preventing the flow of current from the drain terminal to the source terminal. The primary power switches 135, 140 are connected such that when switched on and off in an alternating, cyclic fashion, each polarity of the DC input voltage ($V_{in}$) is alternately applied to a first end of the primary winding 110. A second end of the primary winding 110 is connected to the voltage divider circuit 145 between the first and second capacitors 150, 155, thus providing a fixed voltage reference thereto. Typically, the first and second capacitors 150, 155 are of equal value such that the voltage reference is $V_{in}/2$. To control the alternating operation of the primary power switches 135, 140, the bridge input circuit 120 may further include a pulse-width modulated (PWM) control circuit (not shown) for applying a PWM control signal of an appropriate duty cycle to the gate terminal of each primary power switch 135, 140.

The synchronous rectifier circuit 125, as shown, is configured as a self-driven current doubler synchronous rectifier circuit and includes a first SR 160, a second SR 165, a first filter inductor 170, a second filter inductor 175, and an output capacitor 180. Each SR 160, 165 may be, for example, an n-channel MOSFET having features and operating characteristics as described above in connection with the primary power switches 135, 140. For the sake of example, the SRs 160, 165 are treated as MOSFETs in the following discussion. One skilled in the art will appreciate that other types of transistor switching devices may instead be used to implement the SRs 160, 165. In the current doubler synchronous rectifier configuration, the first and second filter inductors 170, 175, and the first and second MOSFET SRs 160, 165, respectively, are connected in series across the first secondary winding 115, with the output capacitor 180 connecting a node between each filter inductor 170, 175 to a node between each MOSFET SR switch 160, 165. The output voltage of the power converter 100 ($V_{out}$) corresponds to the voltage appearing across the output capacitor 180. An electrical load may be coupled to the synchronous rectifier circuit 125, as shown in FIG. 1a.

The gate drive circuit 130 includes first and second resistors 190, 195 connected such that a first end and a second end of the second secondary winding 185 are referenced to ground through the first and second resistors 190, 195, respectively. The first and second ends of the second secondary winding 185 are also connected to the gate terminals of the first and second MOSFET SRs 160, 165, respectively. The second secondary winding 185 and the resistors 190, 195 are typically sized to provide suitable gate control signals for operating the first and second MOSFET SRs 160, 165 in response to an alternating voltage imposed on the second secondary winding 185 by the primary stage.

Figure 1B:
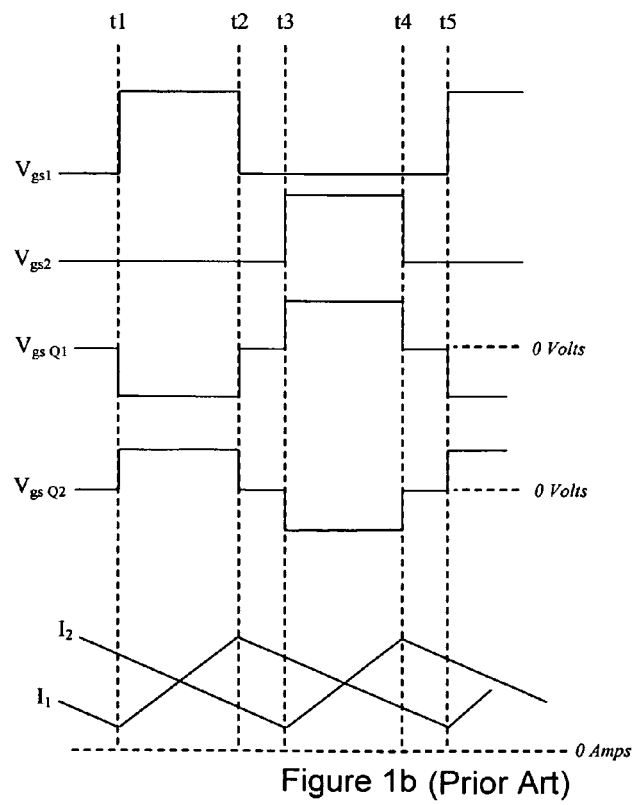
FIG. 1b illustrates idealized current and voltage waveforms present in the power converter of FIG. 1a during operation.

FIG. 1b illustrates idealized current and voltage waveforms present in the power converter 100 of FIG. 1a during operation. In particular, voltages $V_{gs1}$ and $V_{gs2}$ correspond to the PWM control signals applied to the gate terminals of the first and second primary power switches 135, 140, respectively. Voltages $V_{gsQ1}$ and $V_{gsQ2}$ correspond to the gate control signals applied to the first and second MOSFET SRs 160, 165, respectively, by the gate drive circuit 130. Currents $I_1$ and $I_2$ correspond to the current flowing in the first and second filter inductors 170, 175, respectively.

During the first interval from t1 to t2, $V_{gs1}$ is positive and $V_{gs2}$ is zero such that the first primary power switch 135 is turned on and the second primary power switch 140 is turned off. Gate control signals $V_{gsQ1}$ and $V_{gsQ2}$ thus have negative and positive values, respectively. Accordingly, the first MOSFET SR 160 is turned off and the second MOSFET SR 165 is turned on. Current $I_1$ in the first filter inductor 170 is positive and increasing, and current $I_2$ in the second filter inductor 175 is positive and decreasing.

During the second interval from t2 to t3, $V_{gs1}$ and $V_{gs2}$ are both zero, causing the first and second primary power switches 135, 140 to be turned off. During this interval, referred to as "deadtime," both gate control signals $V_{gsQ1}$ and $V_{gsQ2}$ are zero, causing both the first and second MOSFET SRs 160, 165 to be turned off. Current $I_1$ in the first filter inductor 170 is positive and decreasing, and current $I_2$ in the second filter inductor 175 is positive and continues to decrease. Importantly, because the first and second primary power switches 135, 140 are turned off, inductor current "freewheels" through the body diodes of the first and second MOSFET SRs 160, 165, resulting in decreased efficiency.

During the third interval from t3 to t4, $V_{gs1}$ is zero and $V_{gs2}$ is positive such that the first primary power switch 135 is turned off and the second primary power switch 140 is turned on. Gate control signals $V_{gsQ1}$ and $V_{gsQ2}$ thus have positive and negative values, respectively. Accordingly, the first MOSFET SR 160 is on and the second MOSFET SR 165 is off. During this interval, current $I_1$ in the first filter inductor 170 is positive and continues to decrease, and current $I_2$ in the second filter inductor 175 is positive and increasing.

During the fourth interval from t4 to t5, $V_{gs1}$ and $V_{gs2}$ are both zero, causing the first and second primary power switches 135, 140 to be turned off. During this second period of deadtime, both gate control signals $V_{gsQ1}$ and $V_{gsQ2}$ are zero, thus causing the first and second MOSFET SRs 160, 165 to be turned off. Current $I_1$ in the first filter inductor 170 is positive and continues to decrease, and current $I_2$ in the second filter inductor 175 is positive and decreasing. As during the first period of deadtime from t2 to t3, inductor current freewheels through the body diodes of the first and second MOSFET SRs 160, 165, resulting in decreased efficiency.

FIG. 2a is a schematic diagram of another power converter 100 configured with gate rectification diodes 200, 205 for increasing power converter 100 efficiency, as is known in the art. In particular, first and second gate rectification diodes 200, 205 are connected in parallel with the first and second resistors 190, 195 such that an anode terminal and a cathode terminal of each gate rectification diode 200, 205 is connected to the grounded and non-grounded terminals, respectively, of corresponding resistor 190, 195.

FIG. 2b illustrates idealized current and voltage waveforms present in the power converter 100 of FIG. 2a during operation. The effect of the gate rectification diodes 200, 205 is shown by the introduction of a positive voltage shift to the gate control signals $V_{gsQ1}$ and $V_{gsQ2}$ compared to the corresponding waveforms of FIG. 1b. The voltage levels of the gate control signals $V_{gsQ1}$ and $V_{gsQ2}$ during deadtime are thus increased from zero to approximately one-half of their respective voltage levels during power delivery. This voltage shift causes the first and second MOSFET SRs 160, 165 to turn on during deadtime and improves efficiency by allowing freewheeling inductor current to flow through the channel, rather than the body diode, of each MOSFET SR 160, 165.

FIGS. 3a-b illustrate effects of negative inductor current flow during operation of the power converter 100 of FIG. 2a. As noted above, negative current may flow during a period after the power converter 100 is turned on if configured in parallel with other operating power converters, or during operation if the duty cycle of the PWM control signals controlling the first and second primary power switches 135, 140 is decreased in order to command a lower output voltage.

At time t1, the duty cycle of the PWM control signals is reduced, resulting in a transition of $V_{gs1}$ from positive to zero and thus the early termination of the first primary power switch 135. During the first interval from t1 to t2, negative current $I_1$ in the first filter inductor 170 is directed through the first secondary winding 115. Due to coupling between the first secondary winding 115 and the second secondary winding 185, $V_{gsQ1}$ remains zero and $V_{gsQ2}$ remains positive, thus maintaining the first and second MOSFET SRs 160, 165 off and on, respectively, until negative current $I_1$ decreases to zero at time t2. During this interval, negative current $I_2$ drawn by the second filter inductor 175 from the output continues to increase. The flow of negative current $I_1$ through the first secondary winding 115 is also reflected to the primary winding 110, causing a voltage to be applied to the first and second capacitors 150, 155.

After negative current $I_1$ stored by the first filter inductor 170 is dissipated at time t2, the first and second MOFET SRs 160, 165 are turned on due to the positive voltage shift introduced to the gate control signals $V_{gsQ1}$ and $V_{gsQ2}$ by the gate rectification diodes 200, 205. During the interval of deadtime from t2 to t3, negative current $I_1$ in the first filter inductor 170 is increasing, and negative current $I_2$ in the second filter inductor 175 continues to increase.

At time t3, the $V_{gs2}$ transitions from zero to positive, thus causing $V_{gsQ1}$ to remain positive and causing $V_{gsQ2}$ to transition to zero. Subsequent to time t3, continued operation of the first and second primary power switches 135, 140 at the reduced duty cycle will limit the negative current drawn from the output to the peak-to-peak ripple current in each filter inductor 170, 175. At this point, the time between t2 and t3 approaches zero.

Figure 4:
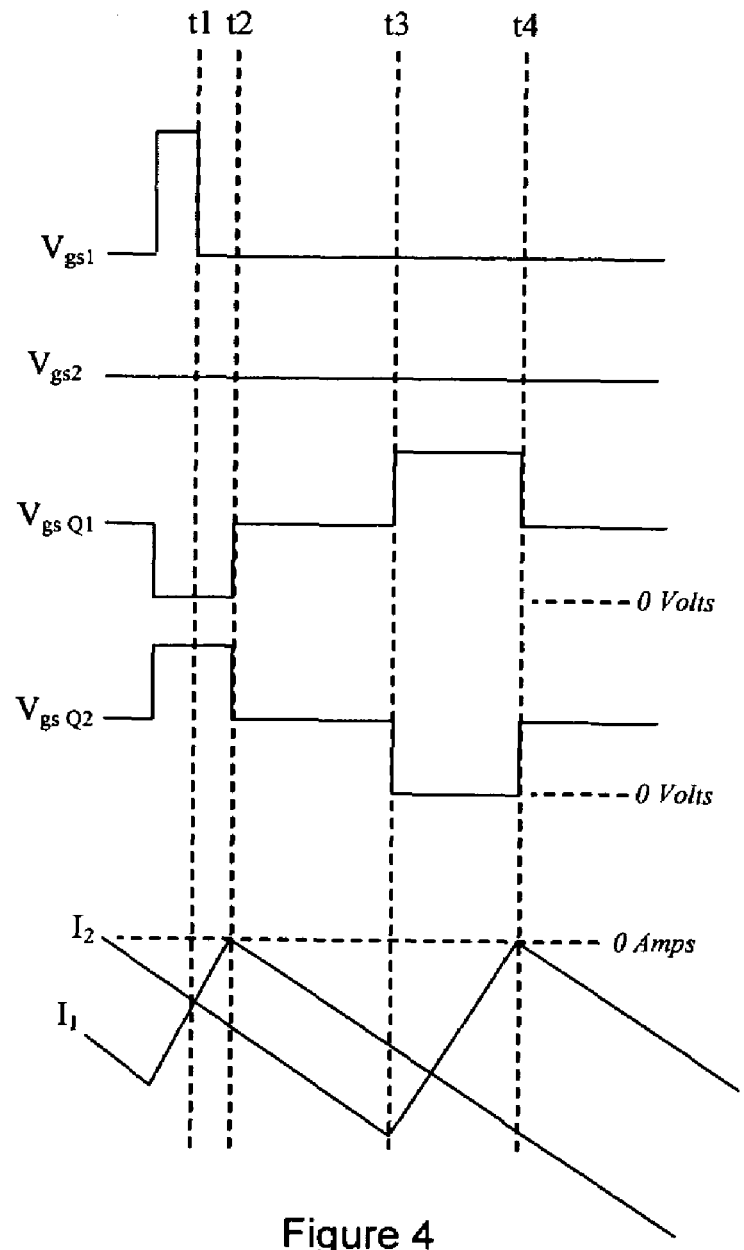
FIG. 4 illustrates a condition of self-oscillation caused by turning off the power converter of FIG. 3a during negative inductor current flow.

FIG. 4 illustrates a condition of self-oscillation caused by turning off the power converter 100 of FIG. 3a during negative inductor current flow. At time t1, the power converter 100 is turned off (i.e., the bridge input circuit 120 is disabled and operation of primary power switches 135, 140 is terminated). As described above in connection with FIGS. 3a-b, the flow of negative current $I_1$ in the second secondary winding 115 maintains the first and second MOSFET SRs 160, 165 off and on, respectively, until $I_1$ decreases to zero at time t2. At time t2, the first and second MOSFET SRs 160, 165 are turned on due to the positive voltage shift introduced to the gate control signals $V_{gsQ1}$ and $V_{gsQ2}$ by the gate rectification diodes 200, 205. Importantly, unlike the power converter 100 of FIG. 3a in which the negative current ramp down from t2 to t3 was limited by the period between each drive cycle of the first and second primary power switches 135, 140, the first and second MOSFET SRs 160, 165 are now maintained on until their gate voltages are discharged below threshold by the first and second resistors 190, 195, respectively, at time t3. At this time, negative current $I_2$ in the second filter inductor 175 discharges through the first secondary winding 115, thus turning the first and second MOSFET SRs 160, 165 on and off, respectively, until $I_2$ decreases to zero at time t4. At time t4, the first and second MOSFET SRs 160, 165 are again turned on by the first and second gate rectification diodes 190, 195 until their gate voltages are discharged. Because the switching frequency of the first and second MOSFET SRs 160, 165 is now determined by their gate discharge times, the deadtime (and thus the peak-to-peak ripple current in each filter inductor 170, 175) increases significantly, as shown in FIG. 4. Reflection of these currents from the first secondary winding 115 to the primary and second secondary windings 110, 185 may thus result in the application of destructive voltages to the capacitors 150, 155, the first and second MOSFET SRs 160, 165, and other power converter 100 components.

Figure 5:
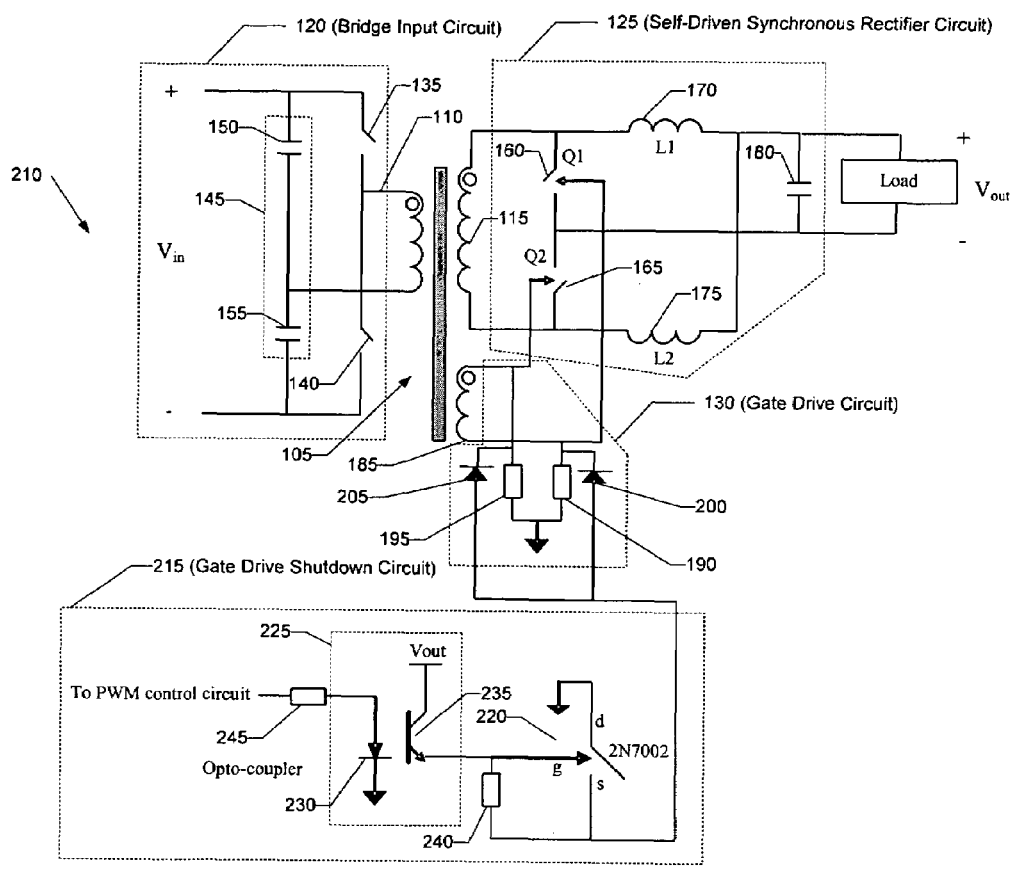
FIG. 5 illustrates a power converter according to various embodiments of the present invention.

FIG. 5 illustrates a power converter 210 according to various embodiment of the present invention. In addition to including features discussed above in connection with the power converter 100, the power converter 210 includes a gate drive shutdown circuit 215 for removing the gate rectification diodes 190, 195 from the gate drive circuit 130 after operation of the first and second primary power switches 135, 140 is terminated. According to various embodiments, the gate drive shutdown circuit 215 includes a switch 220 interposed between the anodes of the first and second gate rectification diodes 200, 205 and ground such that the gate rectification diodes 200, 205 are referenced to ground when the switch 220 is on. As shown in FIG. 5, the switch 220 may be, for example, an n-channel enhancement mode MOSFET switch having a source terminal connected to the anodes of the gate rectification diodes 200, 205 and a drain terminal connected to ground. Turning on the n-channel enhancement mode MOSFET switch 220 during operation of the power converter 210 (i.e., forward biasing a gate terminal of the n-channel enhancement mode MOSFET switch 220) causes the gate rectification diodes 200, 205 to be referenced to ground, thereby introducing a positive voltage shift to the gate control signals $V_{gsQ1}$ and $V_{gsQ2}$. The first and second MOFET SRs 160, 165 thus remain on during deadtime, improving power converter efficiency.

Turning the n-channel enhancement mode MOSFET switch 220 off (i.e., reverse biasing the gate terminal) when operation of the first and second primary power switches 135, 140 is terminated causes the gate rectification diodes 200, 205 to "float" above ground. Accordingly, the gate rectification diodes 200, 205 are effectively removed from the gate drive circuit 130, eliminating positive voltage shift to the gate control signals $V_{gsQ1}$ and $V_{gsQ2}$.

In various embodiments, the on/off state of the n-channel enhancement mode MOSFET switch 220 may be controlled in the manner described above based upon the modulation of either PWM control signal $V_{gs1}$ and $V_{gs2}$. For example, the gate drive shutdown circuit 215 may be configured such that the gate terminal of the n-channel enhancement mode MOSFET switch 220 is forward biased only when $V_{gs2}$ is being modulated (i.e., when the power converter 210 is in operation). In various embodiments, this may be accomplished, for example, by using a signal conditioning circuit (not shown) for filtering $V_{gs2}$ to produce a DC voltage suitable for forward-biasing the gate of the n-channel enhancement mode MOSFET switch 220. In other embodiments, the on/off state of the n-channel enhancement mode MOSFET switch 220 may be controlled based upon a signal other than a PWM control signal that is present in the power converter 210 during operation, such as, for example, the output voltage ($V_{out}$).

Figure 6:
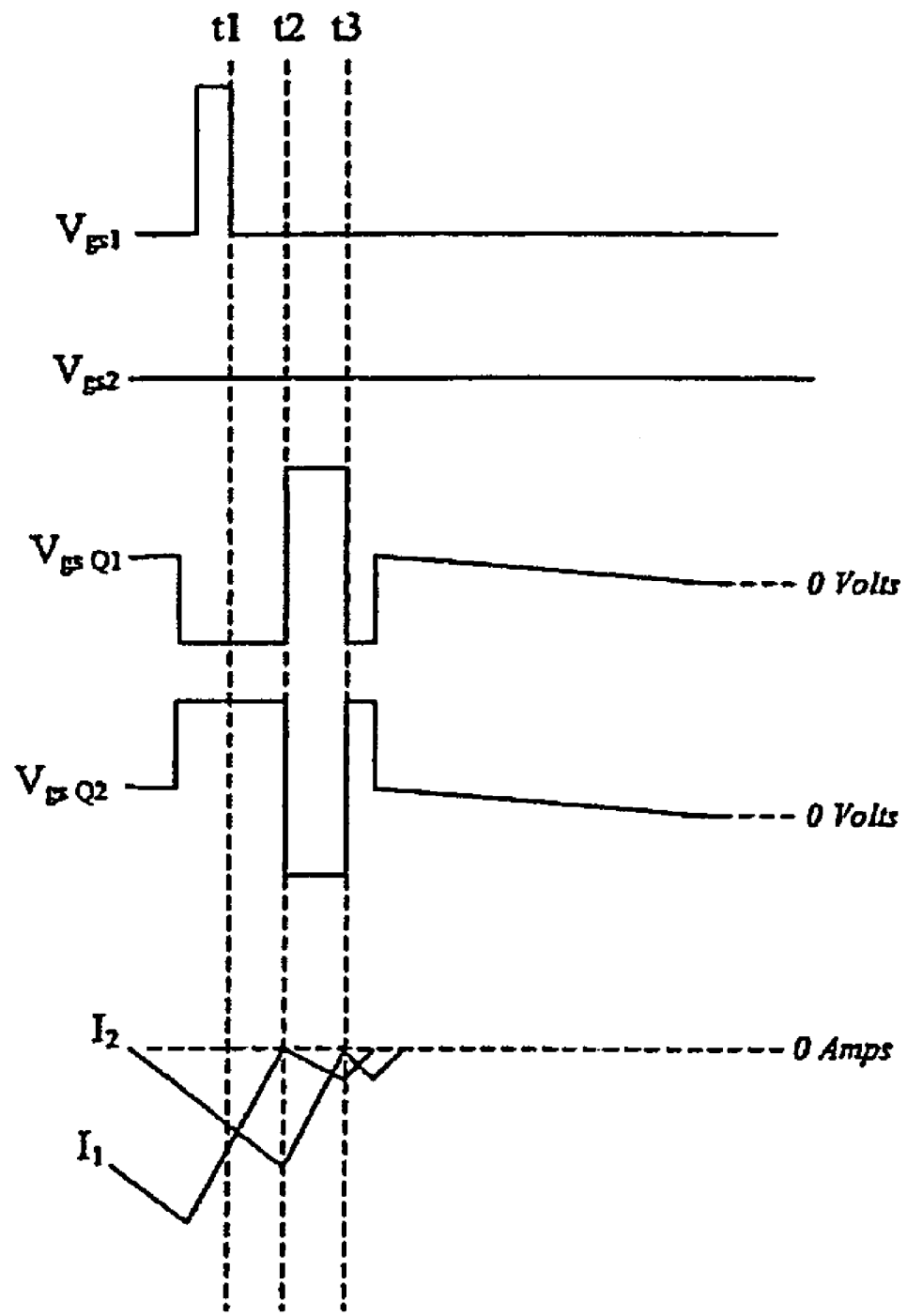
FIG. 6 illustrates idealized voltage and current waveforms in the power converter of FIG. 5 according to various embodiments of the present invention.

In embodiments in which the on/off state of the n-channel enhancement mode MOSFET switch 220 is controlled based upon a signal derived from the primary stage (e.g., a PWM control signal), the gate drive shutdown circuit 215 may further include an isolator 225 for electrically isolating the n-channel enhancement mode MOSFET switch 220 from the primary stage of the power converter 210. According to various embodiments, the isolator 225 may be an opto-coupler comprising an LED 230 and a phototransistor 235, as shown in FIG. 6. The phototransistor 235 may include a collector terminal referenced to the output voltage ($V_{out}$) and an emitter terminal connected to the gate terminal of n-channel enhancement mode MOSFET switch 220 and to the source terminal thereof via a resistor 240. The LED 230 may be connected to the signal conditioning circuit via a current-limiting resistor 245 such that the LED 230 is energized and the phototransistor 235 rendered conductive when the signal conditioning circuit detects a PWM control signal. The resulting voltage drop across the resistor 240 turns the n-channel enhancement mode MOSFET switch 220 on, thus referencing the gate rectification diodes 200, 205 to ground. Where the duty cycle of the PWM control signal is sufficient to operate the opto-coupler, the opto-coupler may be connected directly to the PWM control circuit, thereby eliminating the need for a signal conditioning circuit, as shown in FIG. 6.

According to other embodiments, the isolator 225 may be, for example, a pulse transformer connected to the PWM control circuit. In such embodiments, the transformer output may be filtered by the signal conditioning circuit in order to produce a DC voltage for operating the n-channel enhancement mode MOSFET switch 220.

FIG. 6 illustrates idealized voltage and current waveforms in the power converter 210 of FIG. 5 according to various embodiments of the present invention. At time t1, the primary power switches 135, 140 are terminated, and the gate rectification diodes 190, 195 are removed from the gate drive circuit 130 by the gate drive shutdown circuit 215. The flow of negative current $I_1$ through the first secondary winding 115 maintains the first and second MOSFET SRs 160, 165 off and on, respectively, until $I_1$ decreases to zero at time t2. Because the gate rectification diodes 190, 195 are removed, there is no longer a positive voltage shift in the gate control signals $V_{gsQ1}$ and $V_{gsQ2}$. Accordingly, the second MOSFET SR 165 is turned off at t2, and the resulting flow of negative current $I_2$ through the first secondary winding 115 turns the first MOSFET SR 160 on until negative current $I_2$ decreases to zero at time t3. As seen in FIG. 6, removal of the gate rectification diodes 190, 195 thus increases the switching frequency of the first and second MOSFET SRs 160, 165 during self-oscillation, resulting in the rapid decay of the negative currents $I_1$ and $I_2$. Accordingly, the large ripple currents shown in FIG. 4 are avoided.

Figure 7A:
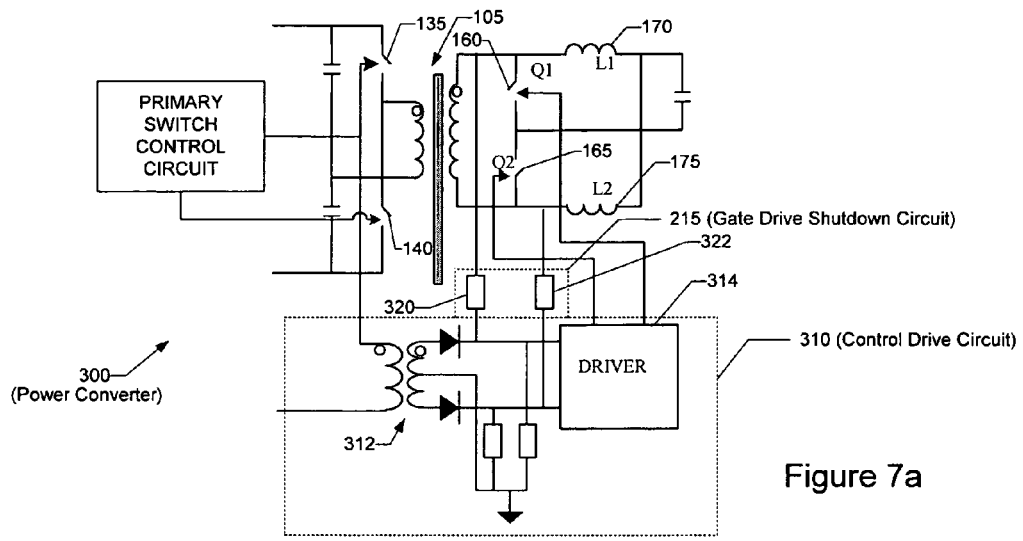
FIG. 7a illustrates a power converter according to other various embodiments of the present invention.

FIG. 7a is a diagram of a power converter 300 according to other various embodiments of the present invention. The power converter 300 of FIG. 7 is similar to that of the converter 210 of FIG. 5, except that whereas the SRs 160, 165 of the converter 210 of FIG. 5 are self-driven based on a voltage across the second secondary winding 185, the SRs 160, 165 of the converter 300 of FIG. 7 are controlled by a control drive circuit 310. According to various embodiments, the control drive circuit 310 may include a control transformer 312 that is not coupled to the same core as the main power transformer 105. Rather, the primary winding of the control transformer 312 may be responsive to a control signal (such as a PWM control signal) used to control the primary switches 135, 140. In that way, the control transformer 312 may be pulsed synchronously with one of the primary switches (primary switch 135 in the example of FIG. 7). The secondary winding of the control transformer 312 may be coupled to a driver 314 that drives the SRs 160, 165. In other embodiments, the driver 314 may be connected to the primary winding of the control transformer 312 and the SRs 160, 165 may be driven by the voltage across the secondary winding of the control transformer 312.

Figure 7B:
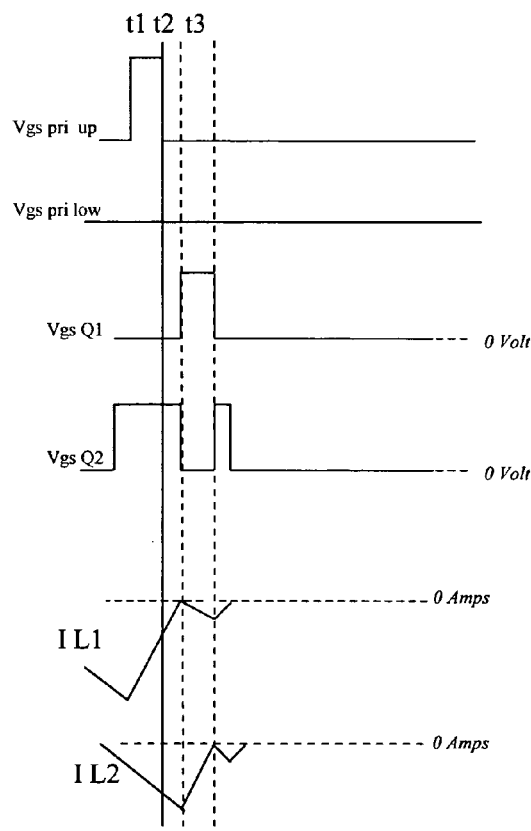
FIG. 7b includes waveforms illustrating the operation of the converter of FIG. 7a according to various embodiments.

In such a control driven scheme, the gate drive shutdown circuit 215 may include a pair of resistors 320, 322. The first resistor 320 may be connected to the drain of the first SR 160 and a first input of the driver 314. The second resistor 322 may be connected to the drain of the second SR 165 and a second input for the driver 314. As such, when there is negative current in the output inductors 170, 175 and the SRs 160, 165 are off (due to the primary switches 135, 140 being turned off), the resistors 320, 322 can dissipate and dampen the energy built up in the inductors 170, 175. For example, with reference to the waveforms of FIG. 7b, the primary switch 135 stops switching at time t1 with negative currents in the output inductors 170, 175. At this point, there is no signal from the control transformer 312 to the driver 314 because the primary switch 135 is turned off. Therefore, the voltage on the drain of the SR 160 may keep the SR 165 on via the driver 314, which is responsive to the voltage at the drain of the SR 160 via the resistor 320, until the output inductor 170 is depleted at time t2. The current in L2 then forces the drain of the SR 165 high and turns the SR 160 on. The current from the output inductor 175 is directed through the transformer 105 to the SR 160 until the inductor 175 is depleted. As can be seen in FIG. 7b, the oscillations in the current in the output inductors 170, 175 eventually stop.

Whereas particular embodiments of the invention have been described herein for the purpose of illustrating the invention and not for the purpose of limiting the same, it will be appreciated by those of ordinary skill in the art that numerous variations of the details, materials, configurations and arrangement of parts may be made within the principle and scope of the invention without departing from the spirit of the invention. For example, the power converter topology may instead be a full bridge power converter topology. Additionally, different types of transistor switches may be used to implement the switching functions of the MOSFET SRs 160, 165 and the n-channel enhancement mode MOSFET switch 220 of the gate drive shutdown circuit 215.

What is claimed is:

1. A power converter, comprising:
   a transformer having a primary winding, a first secondary winding, and a second secondary winding;
   a bridge input circuit comprising at least two primary power switches for coupling input power to the primary winding;
   a self-driven synchronous rectifier circuit connected to the second secondary winding, wherein the self-driven synchronous rectifier circuit includes a first self-driven synchronous rectifier for rectifying a voltage across the first secondary winding, and wherein a control terminal of the first synchronous rectifier is controlled by a voltage across the second secondary winding;
   a gate drive circuit comprising a first diode connected to the control terminal of the first synchronous rectifier for introducing a positive dc level shift thereto when the at least two primary switches are off; and
   a gate drive shutdown circuit connected to the first diode of the gate drive circuit, the gate drive shutdown circuit including a switch for removing the dc level shift from the control terminal of the first synchronous rectifier when operation of the bridge input circuit is terminated.

2. The power converter of claim 1, wherein the bridge input circuit is a half bridge input circuit.

3. The power converter of claim 1, wherein the bridge input circuit is a full bridge input circuit.

4. The power converter of claim 1, wherein the self-driven synchronous rectifier circuit includes a self-driven current doubler synchronous rectifier circuit.

5. The power conveder of claim 1, wherein the switch of the gate drive shutdown circuit includes a control terminal responsive to a signal received from the self-driven synchronous rectifier circuit.

6. The power converter of claim 1, wherein the switch of the gate drive shutdown circuit includes a control terminal responsive to a signal received from the bridge input circuit.

7. The power converter of claim 6, wherein the signal received from the bridge input circuit is a PWM control signal.

8. The power converter of claim 6, wherein the gate drive shutdown circuit further includes an isolator for isolating the control terminal of the switch from the bridge input circuit.

9. The power converter of claim 8, wherein the isolator includes an opto-coupler.

10. The power converter of claim 8, wherein the isolator includes a transformer.

11. A power converter, comprising:
    a transformer having a primary winding and a secondary winding;
    a bridge input circuit connected to the primary winding;
    a first control-driven synchronous rectifier connected to the secondary winding for rectifying a voltage across the secondary winding during a first phase;
    a second control-driven synchronous rectifier connected to the secondary winding for rectifying the voltage across the secondary winding during a second phase;
    an output circuit including a first output inductor connected to the first control-driven synchronous rectifier and a second output inductor connected to the second control-driven synchronous rectifier;
    a synchronous rectifier control circuit for controlling the first and second control-driven synchronous rectifiers wherein the synchronous rectifier control circuit includes a driver having a first output terminal connected to a control terminal of the first control-diven synchronous rectifier and a second output terminal connected to a control terminal of the second control-driven synchronous rectifier; and
    a gate drive shutdown circuit connected to the first and second control-driven synchronous rectifiers for turning on the second synchronous rectifier when primary switches of the bridge input circuit are off and there is negative current in the first and second output inductors.

12. The power converter of claim 11, wherein the gate drive shutdown circuit includes:
    a first resistor connected to the first synchronous rectifier; and
    a second resistor connected to the second synchronous rectifier.

13. The power converter of claim 1, wherein the switch of the gate drive shutdown circuit comprises a conduction channel between a first terminal and a second terminal, wherein the first terminal is connected to the anode of the first diode of the gate drive circuit and the second terminal is connected to ground such that when the switch is turned on, the first diode introduces the positive dc level shift to the control terminal of the first synchronous rectifier.

14. The power converter of claim 13, wherein the switch of the gate drive shutdown circuit includes a control terminal responsive to a signal received from the self-driven synchronous rectifier circuit.

15. The power converter of claim 1, wherein the switch of the gate drive shutdown circuit includes a control terminal responsive to a signal received from the bridge input circuit.

16. The power converter of claim 11, wherein the bridge input circuit is a half bridge input circuit.

17. The power converter of claim 11, wherein the bridge input circuit is a full bridge input circuit.

18. The power converter of claim 12, wherein the synchronous rectifier control circuit further comprises a control transformer coupled to the driver.

19. The power converter of claim 18, wherein the control transformer comprises:

a primary winding responsive to a PWM signal that is used to control the primary switches of the bridge input circuit; and a secondary winding coupled to the driver.

20. The power converter of claim 19, wherein the control transformer has a different core than the transformer.

* * * * *

UNITED STATES PATENT AND TRADEMARK OFFICE
CERTIFICATE OF CORRECTION

PATENT NO. : 7,362,598 B2 Page 1 of 1
APPLICATION NO. : 11/016303
DATED : April 22, 2008
INVENTOR(S) : Schaible et al.

It is certified that error appears in the above-identified patent and that said Letters Patent is hereby corrected as shown below:

COLUMN 10:

Line 5, claim 6 delete "conveder" and substitute therefore --converter--.

COLUMN 10:

Line 34, claim 11 delete "synchronous rectifiers" and substitute therefore --synchronous rectifiers,--.

Signed and Sealed this

Sixth Day of April, 2010

David J. Kappos
*Director of the United States Patent and Trademark Office*